(12) United States Patent
Maeng et al.

(10) Patent No.: US 11,550,948 B2
(45) Date of Patent: Jan. 10, 2023

(54) APPARATUSES AND METHODS FOR DATA CLEARANCE TRAVERSAL

(71) Applicant: Wells Fargo Bank, N.A., San Francisco, CA (US)

(72) Inventors: Joon Maeng, Newcastle, WA (US); Ramanathan Ramanathan, Bellevue, WA (US); Pierre Arbadjian, Matthews, NC (US); Andrew J. Garner, IV, State Road, NC (US); Ramesh Yarlagadda, Charlotte, NC (US); Abhijit Rao, Irvine, CA (US); Adam Sanders, Huntersville, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 292 days.

(21) Appl. No.: 16/874,169

(22) Filed: May 14, 2020

(65) Prior Publication Data

US 2021/0357527 A1  Nov. 18, 2021

(51) Int. Cl.
*G06F 21/62* (2013.01)
*G06N 20/00* (2019.01)

(52) U.S. Cl.
CPC ......... *G06F 21/6245* (2013.01); *G06N 20/00* (2019.01)

(58) Field of Classification Search
CPC .. G06F 21/6245; G06F 17/18; G06F 3/04815; G06N 20/00; G06Q 10/04
See application file for complete search history.

(56) References Cited

U.S. PATENT DOCUMENTS

| | | | | |
|---|---|---|---|---|
| 10,769,113 | B2 * | 9/2020 | Jones | G06F 16/1844 |
| 10,949,425 | B2 * | 3/2021 | Grehant | G06F 16/35 |
| 11,144,680 | B2 * | 10/2021 | Jovanovic | G06F 3/0486 |
| 11,294,800 | B2 * | 4/2022 | Hawthorne | G01C 21/343 |

* cited by examiner

*Primary Examiner* — Chandrahas B Patel
(74) *Attorney, Agent, or Firm* — Womble Bond Dickinson (US) LLP

(57) ABSTRACT

Apparatuses, methods, and computer program products are provided for data privacy and clearance traversal. An example method includes receiving a first model having an associated first clearance. The method further includes determining a faulty outcome of the first model due to the first clearance and receiving a second model having an associated second clearance. The method also includes inputting the faulty outcome of the first model to the second model and generating a traversal outcome of the second model. The method further include inputting the traversal outcome to the first model so as to traverse a clearance issue associated with the first clearance. The method also includes preventing access of the second model to user data analyzed by the first model in generating the faulty outcome.

20 Claims, 5 Drawing Sheets

APPARATUSES AND METHODS FOR DATA CLEARANCE TRAVERSAL

TECHNOLOGICAL FIELD

Example embodiments of the present disclosure relate generally to data modeling and, more particularly, to data privacy and clearance traversal.

BACKGROUND

Financial institutions and other entities often collect or otherwise have access to a large amount of user data. This user data may be utilized by these entities to generate models (e.g., machine learning models or otherwise) for providing products to their customers. These institutions, however, are also subject to a number of regulations that limit the factors that may be considered in identifying/selecting customers as well as the model's effect on customers in protected classes. Additionally, some user data may remain dark or otherwise unused by the financial institutions.

BRIEF SUMMARY

As described above, financial institutions and other entities may utilize a variety of models in the normal course of providing products to their customers. By way of example, a model may be created and used to identify or select customers for receiving a particular mortgage product, interest rate, retirement account, or the like. In order to generate these models, these entities may collect or otherwise access user data, and this user data may include various private information (e.g., age, gender, income, geographic location, ethnicity, etc.) associated with users. In many instances, however, this user data remains dark or otherwise unused by the financial institutions. For example, data may remain dark in that the data is incomplete, regulations limit use of the data, security clearance limits access to the data, computing power required is too extensive to analyze the data, and/or the like.

One reason that data may be considered dark is due to clearance restrictions related to data access (e.g., clearance level). For example, data related to credit cards may not be available for use by users in other parts of the business (e.g., outside of the credit card business units) such that this data is equivalent to dark data for users or systems outside of these business units. Another reason that data may be considered dark is due to model capacity. For example, a first machine learning model may have an associated capacity (e.g., known or hidden) indicative of the model's ability to handle (e.g., analyze, process, etc.) a limited amount of data such that data that exceeds the model's capacity may be considered dark. Models (e.g., machine learning models or otherwise) generated without access to this dark data (e.g., data that is unavailable due to clearance issues, model capacity, or otherwise) may produce incorrect, faulty, or otherwise undesirable outcomes. For example, a machine learning model configured to provide credit card recommendations to potential customers may provide incorrect determinations without considering data related to customer mortgages. Said differently, without information regarding a particular customer's outstanding mortgage obligations, a credit card related machine learning model may recommend that the user receive a credit card offer for which the user does not qualify (e.g., due to a large mortgage obligation).

To solve these issues and others, example implementations of embodiments of the present disclosure may utilize various models (e.g., machine learning models) having distinct clearances (e.g., access levels, clearance levels, etc.) in order to traverse potential clearance related issues associated with the models. In operation, a first model having a first clearance may be determined to provide a faulty output. Embodiments of the present disclosure may then receive a second model having a second clearance and the second model may receive the faulty output as a process input. The second model may generate a traversal outcome that is subsequently inputted to the first model so as to traverse a clearance issue associated with the first model. Additionally, embodiments of the present disclosure may also prevent access of the second model to user data analyzed by the first model in generating the faulty outcome. In this way, the inventors have identified that the advent of emerging computing technologies have created a new opportunity for solutions for improving data privacy which were historically unavailable. In doing so, such example implementations confront and solve at least two technical challenges: (1) they traverse clearance related restrictions in model (e.g., machine learning model) operation, and (2) they ensure data privacy related to underlying user data.

As such, apparatuses, methods, and computer program products are provided for data privacy and clearance traversal. With reference to an example method, the example method may include receiving, via a computing device, a first model having an associated first clearance and determining, via model operation circuitry of the computing device, a faulty outcome of the first model due to the first clearance. The method may also include receiving, via clearance circuitry of the computing device, a second model having an associated second clearance and inputting, via the clearance circuitry of the computing device, the faulty outcome of the first model to the second model. The method may also include generating, via the model operation circuitry of the computing device, a traversal outcome of the second model and inputting, via the model operation circuitry of the computing device, the traversal outcome to the first model so as to traverse a clearance issue associated with the first clearance.

In some embodiments, the method may further include generating, via the computing device, a notification in response to determining the faulty outcome.

In some embodiments, determining the faulty outcome of the first model may further include initiating, via the model operation circuitry, performance of the first model and identifying, via the clearance circuitry, secure data required for successful performance of the first model. The method may also include determining, via the clearance circuitry, that the first clearance limits access of the first model to the secure data and determining, via the model operation circuitry, the faulty outcome of the first model due to the first clearance.

In some further embodiments, generating the traversal outcome may further include inputting, via the clearance circuitry, the faulty outcome of the first model to the second model and determining, via the clearance circuitry, that the second clearance permits access of the second model to the secure data. The method may also include accessing, via the clearance circuitry, the secure data by the second model and generating, via the model operation circuitry, a traversal outcome of the second model based upon the faulty outcome and the secure data.

In some embodiments, the second clearance of the second model may be superior to the first clearance of the first model.

In some further embodiments, the method may include preventing, via the clearance circuitry, access of the second model to user data analyzed by the first model in generating the faulty outcome.

In any embodiment, the method may further include determining, via the model operation circuitry, an updated outcome for the first model.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
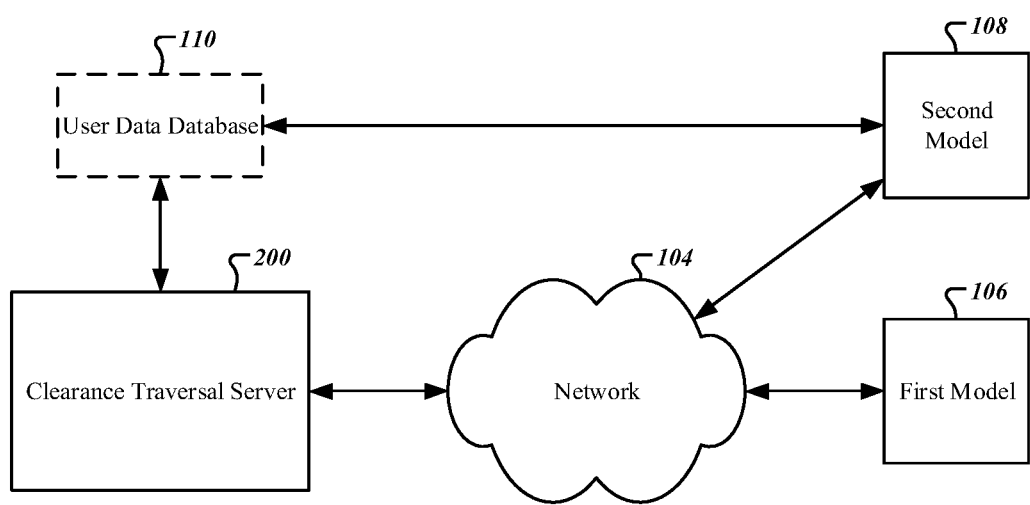
FIG. 1 illustrates a system diagram including devices that may be involved in some example embodiments described herein.

Some embodiments of the present disclosure will now be described more fully hereinafter with reference to the accompanying drawings, in which some, but not all embodiments of the disclosure are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a clearance traversal server as an example "apparatus." However, elements of the apparatus described herein may be equally applicable to the claimed method and computer program product. Thus, use of any such terms should not be taken to limit the spirit and scope of embodiments of the present disclosure.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the terms "model," "machine learning model," and the like refer to mathematical models based upon training or sample data (e.g., user data as described hereafter) and configured to perform various tasks without explicit instructions. Said differently, a machine learning model may predict or infer tasks to be performed based upon training data, learning algorithms, exploratory data analytics, optimization, and/or the like. The present disclosure contemplates that any machine learning algorithm or training (e.g., supervised learning, unsupervised learning, reinforcement learning, self learning, feature learning, anomaly detection, association rules, etc.) and model (e.g., artificial neural networks, decision tress, support vector machines, regression analysis Bayesian networks, etc.) may be used in the embodiments described herein.

Furthermore, the term "first model" may refer to a mathematical model that includes user data associated with a plurality of users. A "first model" as described herein may be utilized for identifying and selecting users to, for example, receive one or more products of a financial institution. The first model may be associated with a first clearance indicative of the first model's ability to access user data. A "second model," may also refer to a mathematical model configured to or otherwise designed for operation with user data. The second model may be similarly associated with a second clearance indicative of the second model's ability to access user data. By way of example, a first model may include a first clearance that provides access of the first model to user data related of a credit card business unit (e.g., credit card data). As such, the first model may only be able to generate outcomes based upon the credit card data the first model is allowed to access due to the first clearance.

The second model may include a second clearance that is different from the first clearance. In some embodiments, the second clearance may be superior to the first clearance (e.g., include the access of the first clearance and further access unavailable to the first clearance). In other embodiments, the second clearance may be equivalent is level (e.g., the same tier or otherwise) as the first clearance, but for a different business unit. By way of example, a second model may include a second clearance that provides access of the second model to user data related of a mortgage business unit (e.g., mortgage data). In such an embodiment, the second clearance may not allow access of the second model to the user data of the first clearance that is accessible by the first model. Although described herein with reference to access related restrictions, the present disclosure contemplates that the second clearance may be associated with an increased capacity relative to a capacity of the first clearance. Said differently, the second model may include the ability to analyze, process, etc. data that exceeds the capacity of the first model (as defined by the first clearance).

As used herein, the term "user data database" refers to a data structure or repository for storing user data. Similarly, the "user data" of the user data database may refer to data generated by or associated with a plurality of users or user device. By way of example, the user data may include the race, gender, income, geographic location, employment, birthdate, social security number, mortgage obligations, current credit cards, credit scores, student loans, etc. of various users. Although described herein with reference to example user data (e.g., credit card data, mortgage data, and the like), the present disclosure contemplates that the user data may refer to any information associated with a user. The user data database may be accessible by one or more software applications of the clearance traversal server 200. The user data database may further allow access to the user data stored therein by one or more models (e.g., first model, second model, etc.) in conjunction with the associated clearance of the respective model.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

With reference to FIG. 1, an example system 100 is illustrated with an apparatus (e.g., a clearance traversal server 200) communicably connected via a network 104 to a first model 106 and a second model 108. The example system 100 may also include a user data database 110 that may be hosted by the clearance traversal server 200 or otherwise hosted by devices in communication with the clearance traversal server 200. Although illustrated connected to the clearance traversal server 200 via a network 104, the present disclosure contemplates that one or more of the first model 106 and/or the second model 108 may be hosted and/or stored by the clearance traversal server 200.

The clearance traversal server 200 may include circuitry, networked processors, or the like configured to perform some or all of the apparatus-based (e.g., clearance traversal server-based) processes described herein, and may be any suitable network server and/or other type of processing device. In this regard, clearance traversal server 200 may be embodied by any of a variety of devices. For example, the clearance traversal server 200 may be configured to receive/ transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, the clearance traversal server 200 may be located remotely from the first model 106, the second model 108, and/or user data database 110, although in other embodiments, the clearance traversal server 200 may comprise the first model 106, the second model 108, and/or the user data database 110. The clearance traversal server 200 may, in some embodiments, comprise several servers or computing devices performing interconnected and/or distributed functions. Despite the many arrangements contemplated herein, the clearance traversal server 200 is shown and described herein as a single computing device to avoid unnecessarily overcomplicating the disclosure.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, 3G, 4G, 5G, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

As described above, the first model 106 may refer to a mathematical model that includes user data associated with a plurality of users and an associated first clearance. The first model 106 may predict or infer tasks to be performed based upon training data (e.g., user data), learning algorithms, exploratory data analytics, optimization, and/or the like. The present disclosure contemplates that any machine learning algorithm or training (e.g., supervised learning, unsupervised learning, reinforcement learning, self-learning, feature learning, anomaly detection, association rules, etc.) and model (e.g., artificial neural networks, decision tress, support vector machines, regression analysis Bayesian networks, etc.) may be used for the first model 106. By way of example, the first model 106 may include user data associated with a plurality of users and trained to identify and select customers for receiving a credit card related offer. Although described herein with reference to a credit card related offer, the present disclosure contemplates that the first model 106 may be configured for any product or similar use based upon the intended application of the associated entity. As described above, the first model 106 may be supported separately from the clearance traversal server 200 (e.g., by a respective computing device) or may be supported by one or more other devices illustrated in FIG. 1.

As described above, the second model 108 may refer to a mathematical model that includes user data associated with a plurality of users and an associated second clearance. The second model 108 may predict or infer tasks to be performed based upon training data (e.g., user data), learning algorithms, exploratory data analytics, optimization, and/or the like. The present disclosure contemplates that any machine learning algorithm or training (e.g., supervised learning, unsupervised learning, reinforcement learning, self-learning, feature learning, anomaly detection, association rules, etc.) and model (e.g., artificial neural networks, decision tress, support vector machines, regression analysis Bayesian networks, etc.) may be used for second model 108. By way of example, the second model 108 may have access to user data associated with a plurality of users and trained to identify and select customer based upon mortgage-related data. Although described herein with reference to a mortgage-related user data, the present disclosure contemplates that the second model 108 may be configured for any product or similar use based upon the intended application of the associated entity. As described above, the second model 108 may be supported separately from the clearance traversal server 200 (e.g., by a respective computing device) or may be supported by one or more other devices illustrated in FIG. 1.

The user data database 110 may be stored by any suitable storage device configured to store some or all of the information described herein (e.g., memory 204 of the clearance traversal server 200 or a separate memory system separate from the clearance traversal server 200, such as one or more database systems, backend data servers, network databases, cloud storage devices, or the like provided by another device (e.g., online application or 3$^{rd}$ party provider) or the first or second models 106, 108). The user data database 110 may comprise data received from the clearance traversal server 200 (e.g., via a memory 204 and/or processor(s) 202), the first model 106, and/or the second model 108 and the corresponding storage device may thus store this data.

Figure 2:
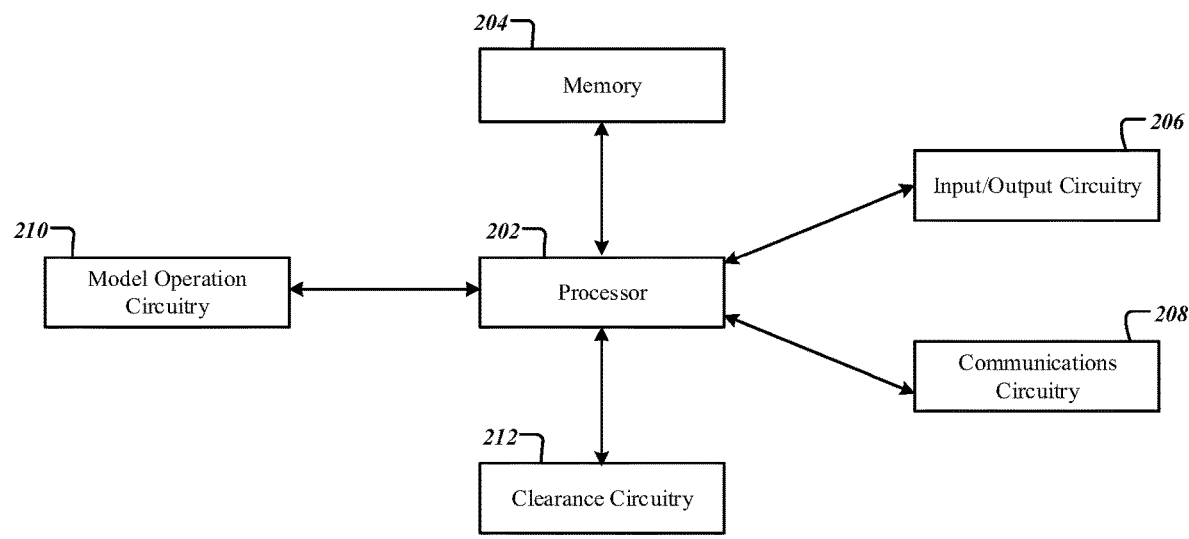
FIG. 2 illustrates a schematic block diagram of example circuitry that may perform various operations, in accordance with some example embodiments described herein.

As illustrated in FIG. 2, the clearance traversal server 200 may include a processor 202, a memory 204, communications circuitry 208, and input/output circuitry 206. Moreover, the clearance traversal server 200 may include model operation circuitry 210 and clearance circuitry 212. The clearance traversal server 200 may be configured to execute the operations described below in connection with FIGS. 3-5. Although components 202-212 are described in some cases using functional language, it should be understood that the particular implementations necessarily include the use of particular hardware. It should also be understood that certain of these components 202-212 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the clearance traversal server 200 may be housed within the first model 106, and/or the second model 108. It will be understood in this regard that some of the components described in connection with the clearance traversal server 200 may be housed within one of these devices (e.g., devices supporting the first model 106 and/or second model 108), while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the clearance traversal server 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the clearance traversal server 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the clearance traversal server 200 to carry out various functions in accordance with example embodiments of the present disclosure.

The processor 202 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the clearance traversal server, and/or remote or "cloud" processors.

In an example embodiment, the processor 202 may be configured to execute instructions stored in the memory 204 or otherwise accessible to the processor 202. Alternatively, or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

The clearance traversal server 200 further includes input/output circuitry 206 that may, in turn, be in communication with processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality such as a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the clearance traversal server 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the clearance traversal server 200 using any of a number of wireless personal area network (PAN) technologies, such as Bluetooth® v1.0 through v3., Bluetooth Low Energy (BLE), infrared wireless (e.g., IrDA), ultra-wideband (UWB), 3G, 4G, LTE, 5G, induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The model operation circuitry 210 includes hardware components designed to determine a faulty outcome of the first model 106, due to clearance related issues or otherwise. The model operation circuitry 210 may further include hardware components for generating a traversal outcome of the second model 108 and/or inputting the traversal outcome to the first model 106 as described hereafter. The model operation circuitry 210 may utilize processing circuitry, such as the processor 202, to perform its corresponding operations, and may utilize memory 204 to store collected information.

The clearance circuitry 212 includes hardware components designed to input a faulty outcome of the first model 106 to the second model 108. The clearance circuitry 212 may also be configured to identify secure data required for successful performance of the first model 106 and/or that the first clearance of the first model 106 and/or that the second clearance of the second model 108 limits/allows access of the first model 106 to one or more instances of secure data. The clearance circuitry 212 may utilize processing circuitry, such as the processor 202, to perform its corresponding operations, and may utilize memory 204 to store collected information.

It should also be appreciated that, in some embodiments, the model operation circuitry 210 and/or the clearance circuitry 212 may include a separate processor, specially configured field programmable gate array (FPGA), or application specific interface circuit (ASIC) to perform its corresponding functions.

In addition, computer program instructions and/or other type of code may be loaded onto a computer, processor, or other programmable clearance traversal server's circuitry to produce a machine, such that the computer, processor other programmable circuitry that execute the code on the machine create the means for implementing the various functions, including those described in connection with the components of clearance traversal server 200.

As described above and as will be appreciated based on this disclosure, embodiments of the present disclosure may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Data Privacy and Clearance Traversal

Figure 3:
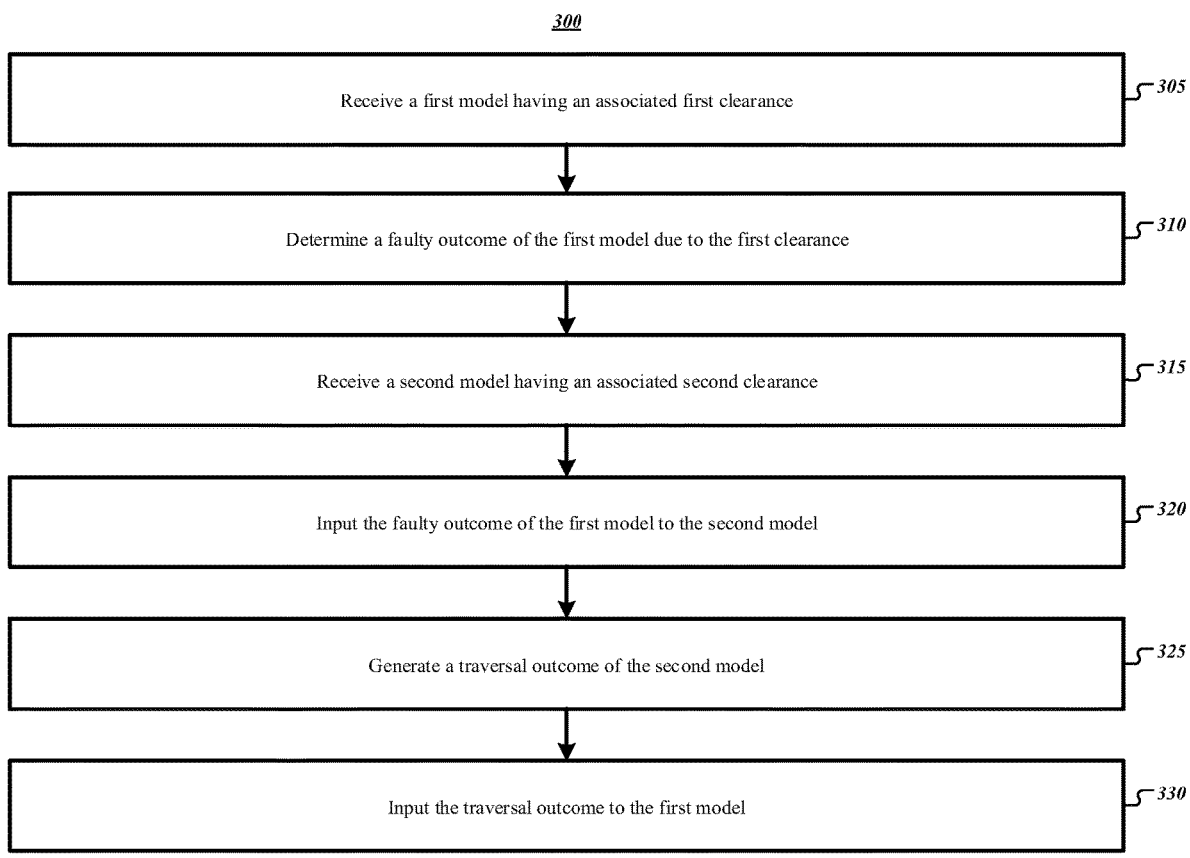
FIG. 3 illustrates an example flowchart for data privacy and clearance traversal, in accordance with some example embodiments described herein.

FIG. 3 illustrates a flowchart containing a series of operations for data privacy and clearance traversal. The operations illustrated in FIG. 3 may, for example, be performed by, with the assistance of, and/or under the control of an apparatus (e.g., clearance traversal server 200), as described above. In this regard, performance of the operations may invoke one or more of processor 202, memory 204, input/output circuitry 206, communications circuitry 208, model operation circuitry 210, and/or clearance circuitry 212.

As shown in operation 305, the apparatus (e.g., clearance traversal server 200) includes means, such as input/output circuitry 206, communications circuitry 208, or the like, for receiving a first model 106 having an associated first clearance. As described above, the first model 106 may include user data associated with a plurality of users. By way of example, the first model 106 may be trained by user data associated with a plurality of users, for example, of a financial institution. The user data for the plurality of users may include user data of any type indicative of the age, ethnicity, gender, geographic location, employment, credit score, account balance, mortgage obligation, or the like. Although described herein with reference to the clearance traversal server 200 receiving the first model 106, over the network 104 or the like, the present disclosure contemplates that, in some embodiments, the clearance traversal server 200 may be configured to generate or otherwise create the first model 106.

The first model 106 may be configured to identify and/or select, for example, customers of a financial institution for a particular product. By way of example, the first model 106 may be generated by user data of a plurality of users (e.g., customers of the financial institution) and may include a plurality of types of user data accessible by the first model 106. The first model 106 may be trained by this user data to identify, for example, customers to receive a credit card related product. As described above, however, the first model 106 may be associated with a first clearance indicative of the first model's 106 ability to access user data. By way of example, the first model 106 may include a first clearance that provides access of the first model 106 to user data related of a credit card business unit (e.g., credit card data). As such, the first model 106 may only be able to generate outcomes based upon the credit card data the first model 106 is allowed to access due to the first clearance. Although described herein with reference to credit card related data, the present disclosure contemplates that the first clearance may allow the first model 106 to access any user data based upon the intended application of the apparatus 200.

Thereafter, as shown in operation 310, the apparatus (e.g., clearance traversal server 200) includes means, such as input/output circuitry 206, communication circuitry 208, model operation circuitry 210, or the like, for determining a faulty outcome of the first model 106 due to the first clearance. As described hereafter with reference to FIG. 4, the first clearance may operate to limit the access of the first model 106 with respect to user data. As described above, user data may, in some instances, be dark due to clearance related issues. By way of example, the first model 106 and associated first clearance may be limited to user data related to credit card data. In performing operation of the first model 106, however, other user data (e.g., mortgage data, current balance data, credit score data, or the like) may be necessary in order to generate valid outcomes of the first model 106. Said differently, in some instances, the first model 106 may require access to user data (e.g., secure data in FIG. 4), the access to which is limited by the first clearance. As such, the model operation circuitry 210 may determine a faulty outcome of the first model due to the absence of this secure data in performing the operations of the first model 106.

By way of continued example, in some embodiments, the first clearance may limit access of the first model 106 to user data related to credit card recommendations (e.g., credit card data). This user data related to credit card recommendation may, for example, include the names, locations, credit scores, current balance, and/or the like of a plurality of users. Said differently, the user data limited by the first clearance may include user data of any type without limitation. In performing the operation of the first model 106, however, the first model may require user data related to mortgages (e.g., secure data in FIG. 4) that is limited by the first clearance (e.g., the first clearance prevents access of the first model 106 to mortgage data). As described above, many business units operate separately from other units and/or are subject to various regulations governing how the user data collected by these business units may be used. In such an example, a mortgage related business unit may be subject to regulations that limit the user data that may be provided to other business units (e.g., a credit card related business unit). Without access to the mortgage related user data, however, the first model 106 may provide a faulty outcome. For example, the first model 106 may recommend a credit card opportunity to a user that would, due to mortgage related obligations, be unfit to receive said opportunity. In this way, the first model 106 may produce a faulty outcome at operation 310. Although described herein with reference to mortgage related obligations, the present disclosure contemplates that any user data may be required by the first model 106 in order to generate a valid output.

Thereafter, as shown in operation 315, the apparatus (e.g., clearance traversal server 200) includes means, such as processor 202, clearance circuitry 212, or the like, for receiving a second model 108 having an associated second clearance. As described above, the second model 108 may include user data associated with a plurality of users. By way of example, the second model 108 may be trained by user data associated with a plurality of users, for example, of a financial institution. The user data for the plurality of users may include user data of any type indicative of the age, ethnicity, gender, geographic location, employment, credit score, account balance, mortgage obligation, or the like. Although described herein with reference to the clearance traversal server 200 receiving the second model 108, over the network 104 or the like, the present disclosure contemplates that, in some embodiments, the clearance traversal server 200 may be configured to generate or otherwise create the second model 108.

The second model 108 may, in some embodiments, be configured to perform operations related to customers of a financial institution for a particular product. By way of example, the second model 108 may be generated by user data of a plurality of users (e.g., customers of the financial institution) and may include a plurality of types of user data accessible by the second model 108. The second model 108 may be trained by this user data to identify, for example, customers to receive a mortgage related product. As described above, however, the second model 108 may be associated with a second clearance indicative of the second model's 108 ability to access user data. By way of example, a second model may include a second clearance that provides access of the second model 108 to user data related of a mortgage business unit (e.g., mortgage data). In some embodiments, the second clearance may not allow access of the second model 108 to the user data of the first clearance that is accessible by the first model 106.

Although described herein with reference to a second model 108 that is configured for use with user data related to mortgage data, the present disclosure contemplates that, in some embodiments, the second model 108 may operate as a supervisory model in that the second model 108 is not associated with a particular type of user data but is instead associated with a second clearance that provides access to all user data of the system 100. Said differently, in such an embodiment, the second model 108 may be configured for traversing clearance related issues as described herein without another user data related operation.

In some embodiments, as shown in operation 320, the apparatus (e.g., clearance traversal server 200) includes means, such as processor 202, clearance circuitry 212, or the like, for inputting the faulty outcome of the first model 106 to the second model 108. As described above and further hereafter, the second model 108 may operate to traverse a clearance issue associated with the first clearance and associated first model 106. In doing so, the second model 108 may receive the faulty output of the first model 106 as an input to the second model 108. As described hereafter with reference to operation 325 and FIG. 5, the faulty output of the first model 106 may be utilized, processed, or otherwise considered by the second model 108 so as to generate a traversal outcome. In some embodiments, such as when the second model 108 operates as a supervisory system, the second model 108 may, in receiving the faulty outcome, access the underlying user data of the first model 106. In other embodiments, the clearance circuitry 212 may prevent access of the second model 108 to user data analyzed by the first model 106 in generating the faulty outcome.

Thereafter, as shown in operation 325, the apparatus (e.g., clearance traversal server 200) includes means, such as processor 202, clearance circuitry 212, or the like, for a generating a traversal outcome of the second model 108. As described further hereafter with reference to FIG. 5, the second model 108 may operate to traverse clearance issues associated with the first model 106 (due to the first clearance) that result in a faulty outcome of the first model 106. In particular, the second model 108 may be configured to access secure data that is unavailable to the first model 106 (e.g., limited by the first clearance). The second model 108 may generate a traversal outcome based upon the faulty outcome of the first model 106 and the data unavailable to the first model 106 (e.g., secure data). By way of continued example, the second model 108 and associated second clearance may have access to mortgage related data (e.g., secure data) that is unavailable to the first model 106. The second model 108 may access the mortgage related data to provide the outcome necessary to correct the faulty outcome of the first model 106 (e.g. a traversal outcome). As described hereafter, the traversal outcome may be subsequently provided to the first model 106.

Thereafter, as shown in operation 330, the apparatus (e.g., clearance traversal server 200) includes means, such as processor 202, model operation circuitry 210, or the like, for inputting the traversal outcome to the first model 106. As described above, the traversal outcome may refer to an outcome of the second model 108 based at least in part on the faulty outcome of the first model 106. The traversal outcome generated by the second model 108 may further be configured to traverse a clearance issue associated with the first clearance and first model 106. As such, in response to determining the traversal outcome at operation 325, the model operation circuitry 210 may input the traversal outcome to the first model 106 such that the previously determined faulty outcome may be corrected (e.g., updated to account for user data to which the first model 106 lacks access). In doing so, the traversal outcome may operate to maintain the security associated with the second model 108 and associated second clearance (e.g., the first model 106 cannot access the secure data), but the first model 106 may receive a sufficient outcome such that the operation of the first model 106 is valid.

Figure 4:
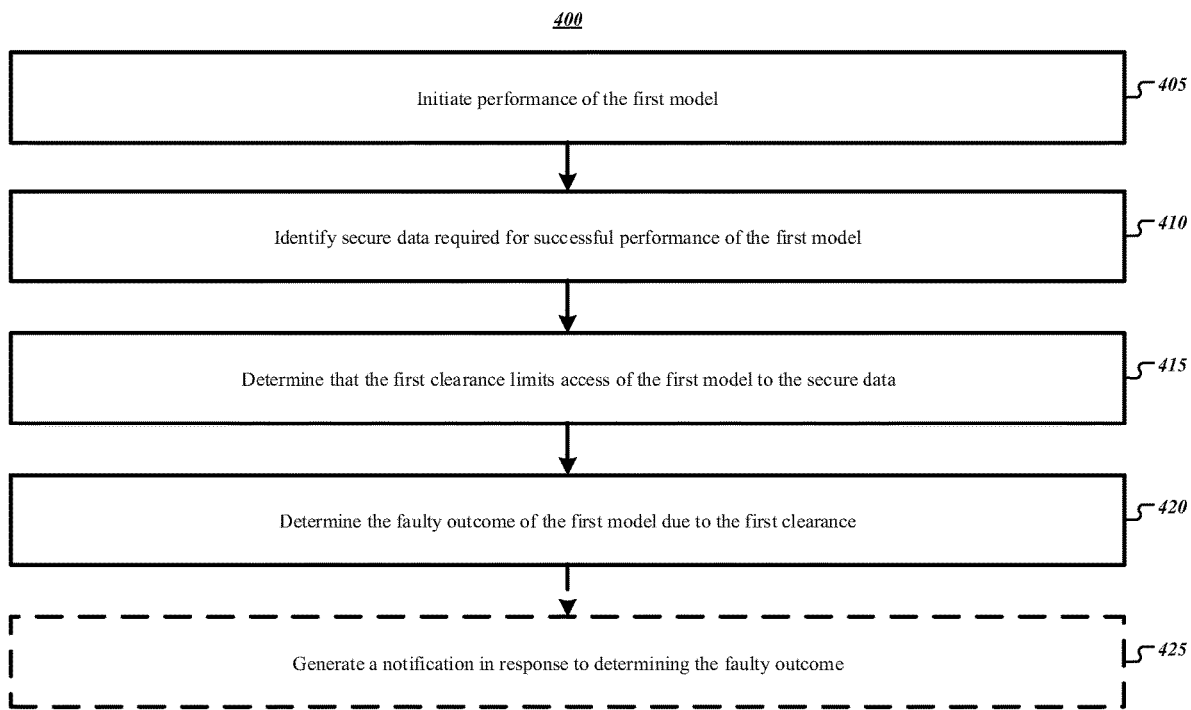
FIG. 4 illustrates an example flowchart for faulty outcome determinations, in accordance with some example embodiments described herein.

Turning next to FIG. 4, a flowchart is shown faulty outcome determinations. The operations illustrated in FIG. 4 may, for example, be performed by, with the assistance of, and/or under the control of an apparatus (e.g., clearance traversal server 200), as described above. In this regard, performance of the operations may invoke one or more of processor 202, memory 204, input/output circuitry 206, communications circuitry 208, model operation circuitry 210, and/or clearance circuitry 212.

As shown in operation 405, the apparatus (e.g., clearance traversal server 200) includes means, such as input/output circuitry 206, communications circuitry 208, model operation circuitry 210, or the like, for initiating performance of the first model 106. As described above, the first model 106 may be configured to analyze user data as allowed by the first clearance of the first model 106. By way of continued example, initiating performance of the first model 106 may cause the first model 106 to analyze user data related to, for example, credit card data. In doing so, the first model 106 may identify and select customers for receiving a credit card related recommendation based upon the credit card related user data.

As shown in operation 410, the apparatus (e.g., clearance traversal server 200) includes means, such as input/output circuitry 206, communications circuitry 208, clearance circuitry 212, or the like, for identifying secure data required for successful performance of the first model 106. As described above, the first model 106 may, in analyzing user data of the plurality of users, identify additional user data (e.g., secure data) necessary for successful performance of the first model 106. By way of continued example, the first model 106 may analyze user data available to the first model 106 for identifying and selecting users to receive a credit card related product. In doing so, the first model 106 may identify or otherwise determine that mortgage related user data (e.g., secure data) may be necessary or required for successful performance of the first model 106. As described above, an otherwise proper recommendation for a credit card related product may be faulty when updated to account for a particular user's mortgage data. The present disclosure further contemplates that the identification at operation 410 may be set by an administrator or user (e.g., data required to be considered in order to be considered a successful performance) and/or may be iteratively determined by analysis of prior successful performances of the first model 106. Said differently, the first model 106 (e.g., machine learning model) may iteratively perform the operations of the first model 106 and, over time, identify or determine user data that results in successful performance of the first model 106.

As shown in operation 415, the apparatus (e.g., clearance traversal server 200) includes means, such as input/output circuitry 206, communications circuitry 208, clearance circuitry 212, or the like, for determining that the first clearance limits access of the first model 106 to the secure data. Once secure data (for example mortgage related user data) is identified as required for successful performance of the first model 106, the clearance circuitry 212 may compare the first clearance with one or more required clearance levels, thresholds, or the like required in order to receive access to the secure data. As described above, the first clearance may operate to limit access of the first model 106 to user data. At operation 415, the clearance circuitry 212 may determine that the first clearance of the first model 106 limits access of the first model 106 with respect to the secure data (e.g., data required for successful operation of the first model 106).

Thereafter, as shown in operation 420, the apparatus (e.g., clearance traversal server 200) includes means, such as processor 202, model operation circuitry 210, or the like, for determining the faulty outcome of the first model 106 due to the first clearance. As described above with reference to operation 310, the first clearance may, for example, limit access of the first model 106 to user data related to credit card recommendations (e.g., credit card data). Without access to mortgage related user data (e.g., secure data), however, the first model 106 may provide a faulty outcome. For example, the first model 106 may recommend a credit card opportunity to a user that would, due to mortgage related obligations, be unfit to receive said opportunity. In this way, the first model 106 may produce a faulty outcome at operation 420.

In some embodiments, as shown in operation 420, the apparatus (e.g., clearance traversal server 200) includes means, such as processor 202, communications circuitry 208, or the like, for generating a notification in response to determining the faulty outcome of the first model 106. In some embodiments, the notification at operation 420 may be presented to a user for review. In other embodiments, the notification at operation 420 may be logged, stored, or otherwise recorded by the clearance traversal server 200.

Figure 5:
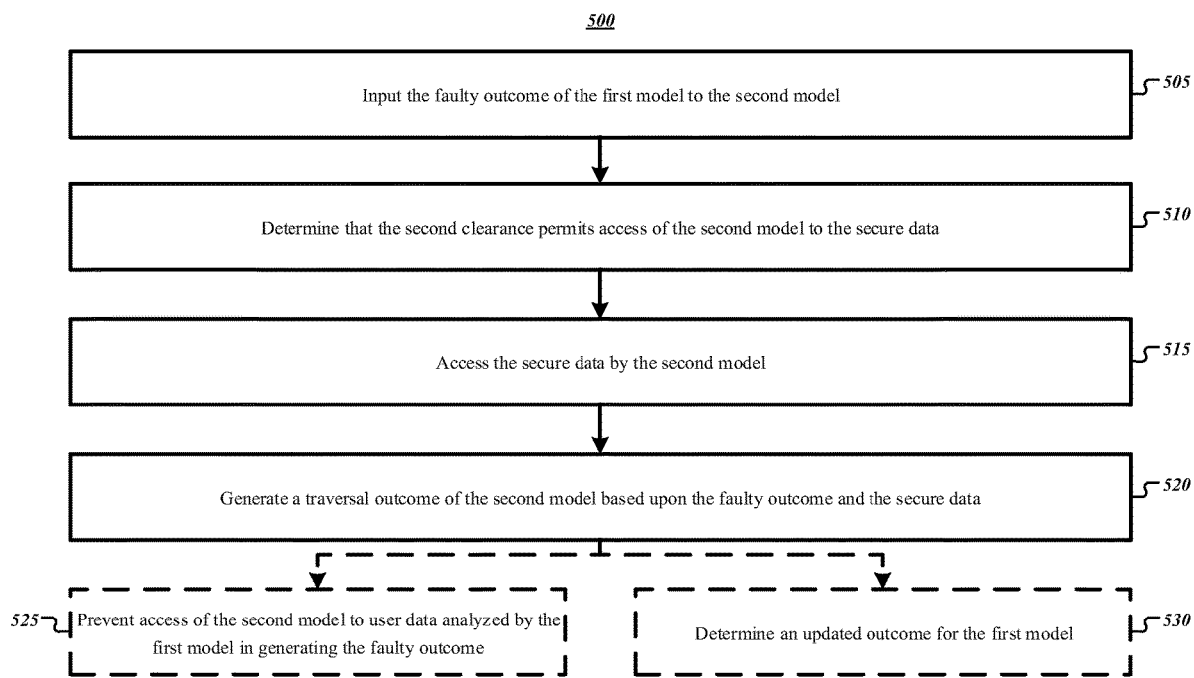
FIG. 5 illustrates an example flowchart for traversal outcome determinations, in accordance with some example embodiments described herein.

Turning next to FIG. 5, a flowchart is shown for traversal outcome determinations. The operations illustrated in FIG. 5 may, for example, be performed by, with the assistance of, and/or under the control of an apparatus (e.g., clearance traversal server 200), as described above. In this regard, performance of the operations may invoke one or more of processor 202, memory 204, input/output circuitry 206, communications circuitry 208, model operation circuitry 210, and/or clearance circuitry 212.

As shown in operation 505, the apparatus (e.g., clearance traversal server 200) includes means, such as input/output circuitry 206, model operation circuitry 210, clearance circuitry 212, or the like, for inputting the faulty outcome of the first model 106 to the second model 108. As described above with reference to operation 320, the second model 108 may operate to traverse a clearance issue associated with the first clearance and associated first model 106. In doing so, the second model 108 may receive the faulty output of the first model 106 as an input to the second model 108. The faulty output of the first model 106 may be utilized, processed, or otherwise considered by the second model 108 so as to generate a traversal outcome. In some embodiments, such as when the second model 108 operates as a supervisory system, the second model 108 may, in receiving the faulty outcome, access the underlying user data of the first model 106. In other embodiments, the clearance circuitry 212 may prevent access of the second model 108 to user data analyzed by the first model 106 in generating the faulty outcome.

As shown in operation 510, the apparatus (e.g., clearance traversal server 200) includes means, such as input/output circuitry 206, communications circuitry 208, clearance circuitry 212, or the like, for determining that the second clearance permits access of the second model 108 to the secure data. The clearance circuitry 212 may compare the second clearance with one or more required clearance levels, thresholds, or the like required in order to receive access to the secure data. As described above, the second clearance may operate to limit access of the second model 108 to user data. In some embodiments, however, the second clearance of the second model 108 may be superior (e.g., greater than, higher than, etc.) to the first clearance of the first model 106. Said differently, the second clearance of the second model 108 may provide access to user data (e.g., more access provided) that is more expansive than that provided by the first clearance of the first model 106. In other embodiments, the second clearance of the second model 108 may instead only be superior in that the second model 108 may access the secure data required by the first model 106. Said differently, the second clearance may be similar in scope, access, etc. to that of the first clearance.

Although described with reference to an access related restriction of the first model 106, the present disclosure contemplates that the superiority of the second clearance may also refer to the ability of the second model 108 to traverse capacity related clearance issues of the first model 106. By way of example, the first model 106 and associated first clearance may have a limited capacity to analyze or process user data. As such, the clearance circuitry 212 may compare the second clearance with one or more required clearance levels, thresholds, or the like related to the capacity required to analyze or process user data. As described above, the second clearance may refer to the capacity of the second model 108 to analyze user data, and in some embodiments, may be superior (e.g., greater than, higher than, etc.) to the first clearance of the first model 106. Said differently, the second clearance of the second model 108 may have a larger capacity to process user data than that provided by the first clearance of the first model 106.

As shown in operation 510, the apparatus (e.g., clearance traversal server 200) includes means, such as input/output circuitry 206, communications circuitry 208, clearance circuitry 212, or the like, for accessing the secure data by the second model at operation 515 and further generating a traversal outcome of the second model 108 based upon the faulty outcome and the secure data at operation 520. As described above with reference to operation 325, the second model 108 may operate to traverse clearance issues associated with the first model 106 (due to the first clearance) that result in a faulty outcome of the first model 106. In particular, the second model 108 may be configured to access secure data that is unavailable to the first model 106 (e.g., limited by the first clearance). The second model 108 may generate a traversal outcome based upon the faulty outcome of the first model 106 and the data unavailable to the first model 106 (e.g., secure data). By way of continued example, the second model 108 and associated second clearance may have access to mortgage related data (e.g., secure data) that is unavailable to the first model 106 due to the second clearance of the second model 108. The second model 108 may access the mortgage related data to provide the outcome necessary to correct the faulty outcome of the first model 106 (e.g. a traversal outcome).

In some embodiments, the apparatus (e.g., clearance traversal server 200) includes means, such as input/output circuitry 206, communications circuitry 208, clearance circuitry 212, or the like, for preventing access of the second model 108 to user data analyzed by the first model 106 in generating the faulty outcome. As described above, the first clearance of the first model 106 and the second clearance of the second model 108 may be mutually exclusive such that the access provided by the first clearance and the second clearance do not coincide. Said differently, although the second model 108 may operate to traverse the clearance issue of the first clearance and associated first model 106, the second model may not access the underlying user data of the first model 106, and vice versa. In this way, the embodiments of the present disclosure may ensure data privacy between models (e.g., first model 106 and second model 108). Furthermore, although described herein with reference to a single second model 108 configured to traverse the clearance issue associated with the first model 106, the present disclosure contemplates that any number of machine learning models may be used to traverse these clearance issues and others.

In some embodiments, the apparatus (e.g., clearance traversal server 200) includes means, such as input/output circuitry 206, communications circuitry 208, model operation circuitry 210, or the like, for determining an updated outcome for the first model 106. As described above, the first model 106 may initially generate a faulty outcome due to the access restrictions of the associated first clearance. Following the operations described above with reference to FIG. 5, however, the first model 106 may output an updated outcome based upon the input of the traversal outcome as described above with reference to operation 330. By way of continued example, the first model 106 may ensure that, for example, credit card related recommendations are properly provided to users based upon consideration of, for example, the respective user's mortgage data.

In doing so, the embodiments of the present disclosure solve these issues by utilizing various models (e.g., machine learning models) having distinct clearances (e.g., access levels, clearance levels, etc.) in order to traverse potential clearance related issues associated with the models. In operation, a first model having a first clearance may be determined to provide a faulty output. Embodiments of the present disclosure may receive a second model having a second clearance and the second model may receive the faulty output as a process input. The second model may generate a traversal outcome that is subsequently inputted to the first model so as to traverse a clearance issue associated with the first model. Additionally, embodiments of the present disclosure may also prevent access of the second model to user data analyzed by the first model in generating the faulty outcome. In this way, the inventors have identified that the advent of emerging computing technologies have created a new opportunity for solutions for improving data privacy which were historically unavailable. In doing so, such example implementations confront and solve at least two technical challenges: (1) they traverse clearance related restrictions in model (e.g., machine learning model) operation, and (2) they ensure data privacy related to underlying user data.

FIGS. 3-5 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the clearance traversal server 200 and executed by a processor 202 of the clearance traversal server 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

CONCLUSION

Many modifications and other embodiments set forth herein will come to mind to one skilled in the art to which this disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for data privacy and clearance traversal, the method comprising:
    receiving, via a computing device, a first model having an associated first clearance;
    identifying, via clearance circuitry, secure data required for successful performance of the first model;
    determining, via model operation circuitry of the computing device, a faulty outcome of the first model based on the first clearance and the identified secure data required for successful performance first model;
    receiving, via clearance circuitry of the computing device, a second model having an associated second clearance;
    inputting, via the clearance circuitry of the computing device, the faulty outcome of the first model to the second model;
    generating, via the model operation circuitry of the computing device, a traversal outcome of the second model; and
    inputting, via the model operation circuitry of the computing device, the traversal outcome to the first model so as to traverse a clearance issue associated with the first clearance.

2. The method according to claim 1, wherein determining the faulty outcome of the first model further comprises:
    initiating, via the model operation circuitry, performance of the first model;
    determining, via the clearance circuitry, that the first clearance limits access of the first model to the secure data; and
    determining, via the model operation circuitry, the faulty outcome of the first model due to the first clearance.

3. The method according to claim 2, wherein generating the traversal outcome further comprises:
    inputting, via the clearance circuitry, the faulty outcome of the first model to the second model;
    determining, via the clearance circuitry, that the second clearance permits access of the second model to the secure data;
    accessing, via the clearance circuitry, the secure data by the second model; and
    generating, via the model operation circuitry, the traversal outcome of the second model based upon the faulty outcome and the secure data.

4. The method according to claim 3, further comprising preventing, via the clearance circuitry, access of the second model to user data analyzed by the first model in generating the faulty outcome.

5. The method according to claim 3, wherein the second clearance of the second model is superior to the first clearance of the first model.

6. The method according to claim 1, further comprising generating, via the computing device, a notification in response to determining the faulty outcome.

7. The method according to claim 1, further comprising determining, via the model operation circuitry, an updated outcome for the first model.

8. An apparatus for data privacy and clearance traversal, the apparatus comprising:
    communications circuitry configured to:

receive a first model having an associated first clearance; and
receive a second model having an associated second clearance;
model operation circuitry configured to determine a faulty outcome of the first model based on the first clearance and identified secure data required for successful performance first model; and
clearance circuitry configured to:
identify the secure data required for successful performance of the first model; and
input the faulty outcome of the first model to the second model,
wherein the model operation circuitry is further configured to:
generate a traversal outcome of the second model; and
input the traversal outcome to the first model so as to traverse a clearance issue associated with the first clearance.

9. The apparatus according to claim 8, wherein the clearance circuitry is further configured to, in response to initiating performance of the first model by the model operation circuitry:
determine that the first clearance limits access of the first model to the secure data,
wherein the model operation circuitry is further configured to determine the faulty outcome of the first model due to the first clearance.

10. The apparatus according to claim 9, wherein the clearance circuitry is further configured to:
input the faulty outcome of the first model to the second model;
determine that the second clearance permits access of the second model to the secure data; and
access the secure data by the second model,
wherein the model operation circuitry is further configured to generate the traversal outcome of the second model based upon the faulty outcome and the secure data.

11. The apparatus according to claim 10, wherein the clearance circuitry is further configured to prevent access of the second model to user data analyzed by the first model in generating the faulty outcome.

12. The apparatus according to claim 10, wherein the second clearance of the second model is superior to the first clearance of the first model.

13. The apparatus according to claim 8, wherein the communications circuitry is further configured to generate a notification in response to determining the faulty outcome.

14. The apparatus according to claim 8, wherein the model operation circuitry is further configured to determine an updated outcome for the first model.

15. A non-transitory computer-readable storage medium for using an apparatus for data privacy and clearance traversal, the non-transitory computer-readable storage medium storing instructions that, when executed, cause the apparatus to:
receive a first model having an associated first clearance;
identify secure data required for successful performance of the first model;
determine a faulty outcome of the first model based on the first clearance and the identified secure data required for successful performance first model;
receive a second model having an associated second clearance;
input the faulty outcome of the first model to the second model;
generate a traversal outcome of the second model; and
input the traversal outcome to the first model so as to traverse a clearance issue associated with the first clearance.

16. The non-transitory computer-readable storage medium according to claim 15 storing instructions that, when executed, cause the apparatus to:
initiate performance of the first model;
determine that the first clearance limits access of the first model to the secure data; and
determine the faulty outcome of the first model due to the first clearance.

17. The non-transitory computer-readable storage medium according to claim 16 storing instructions that, when executed, cause the apparatus to:
input the faulty outcome of the first model to the second model;
determine that the second clearance permits access of the second model to the secure data;
access the secure data by the second model; and
generate the traversal outcome of the second model based upon the faulty outcome and the secure data.

18. The non-transitory computer-readable storage medium according to claim 17 storing instructions that, when executed, cause the apparatus to prevent access of the second model to user data analyzed by the first model in generating the faulty outcome.

19. The non-transitory computer-readable storage medium according to claim 17 storing instructions that, when executed, cause the apparatus to determine an updated outcome for the first model.

20. The non-transitory computer-readable storage medium according to claim 15 storing instructions that, when executed, cause the apparatus to generate a notification in response to determining the faulty outcome.

* * * * *

UNITED STATES PATENT AND TRADEMARK OFFICE
CERTIFICATE OF CORRECTION

| | | |
|---|---|---|
| PATENT NO. | : 11,550,948 B2 | Page 1 of 1 |
| APPLICATION NO. | : 16/874169 | |
| DATED | : January 10, 2023 | |
| INVENTOR(S) | : Joon Maeng et al. | |

It is certified that error appears in the above-identified patent and that said Letters Patent is hereby corrected as shown below:

On the Title Page

Inventors item (72), the third inventor's name - Pierre Arbadjian - should read -- Pierre Arbajian --

Signed and Sealed this
Third Day of September, 2024

Katherine Kelly Vidal
*Director of the United States Patent and Trademark Office*